INVENTOR

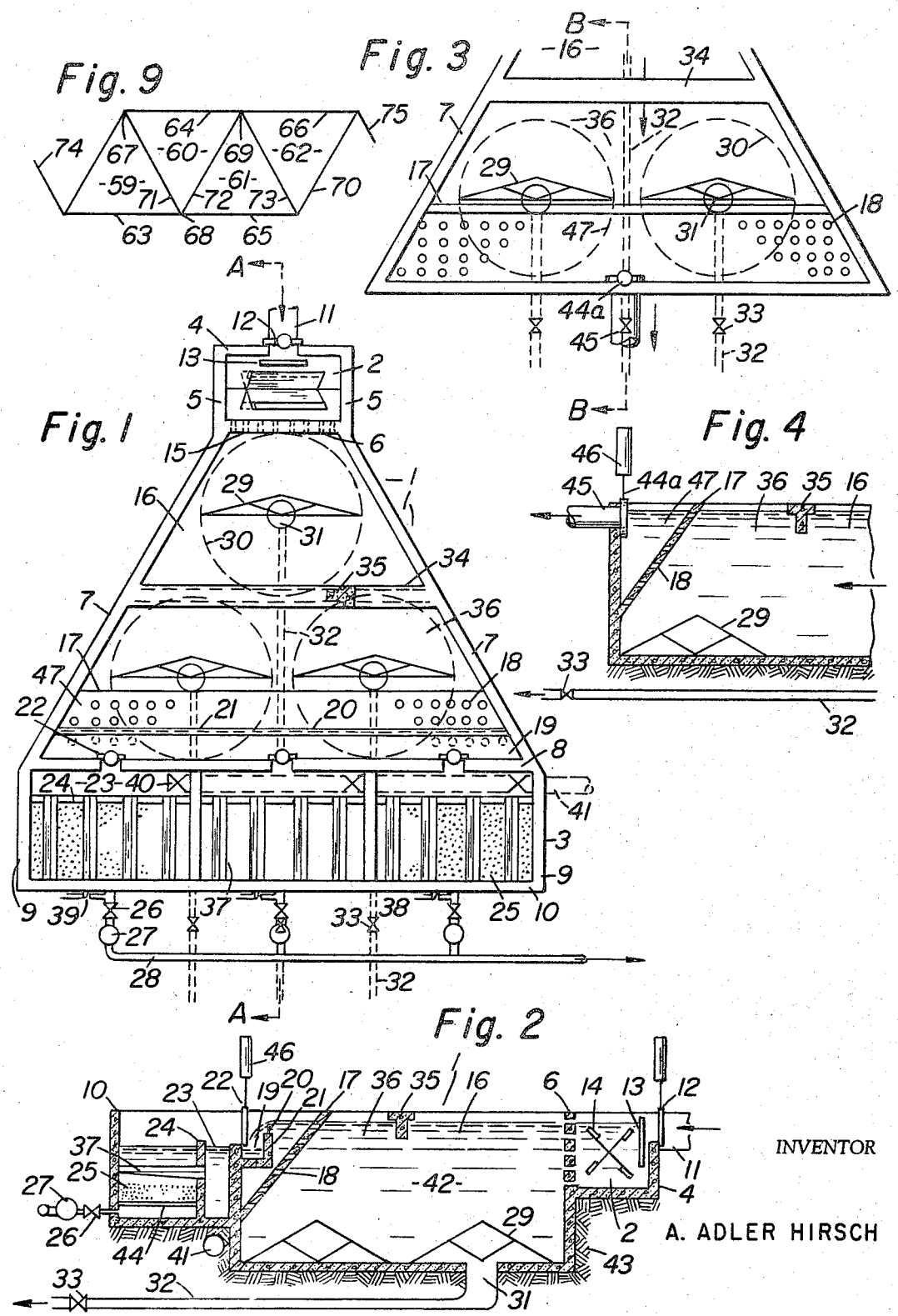

A. ADLER HIRSCH

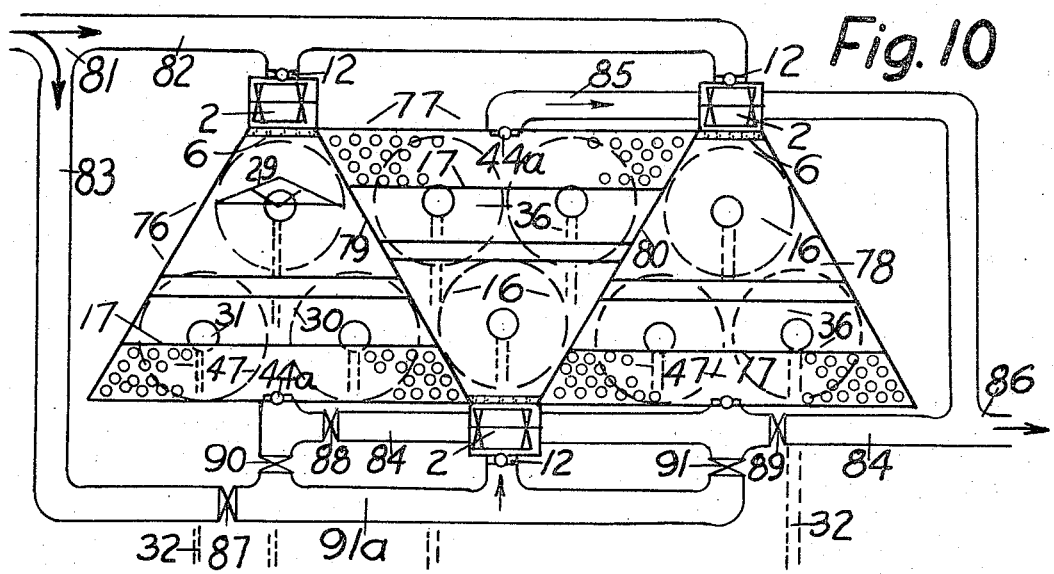
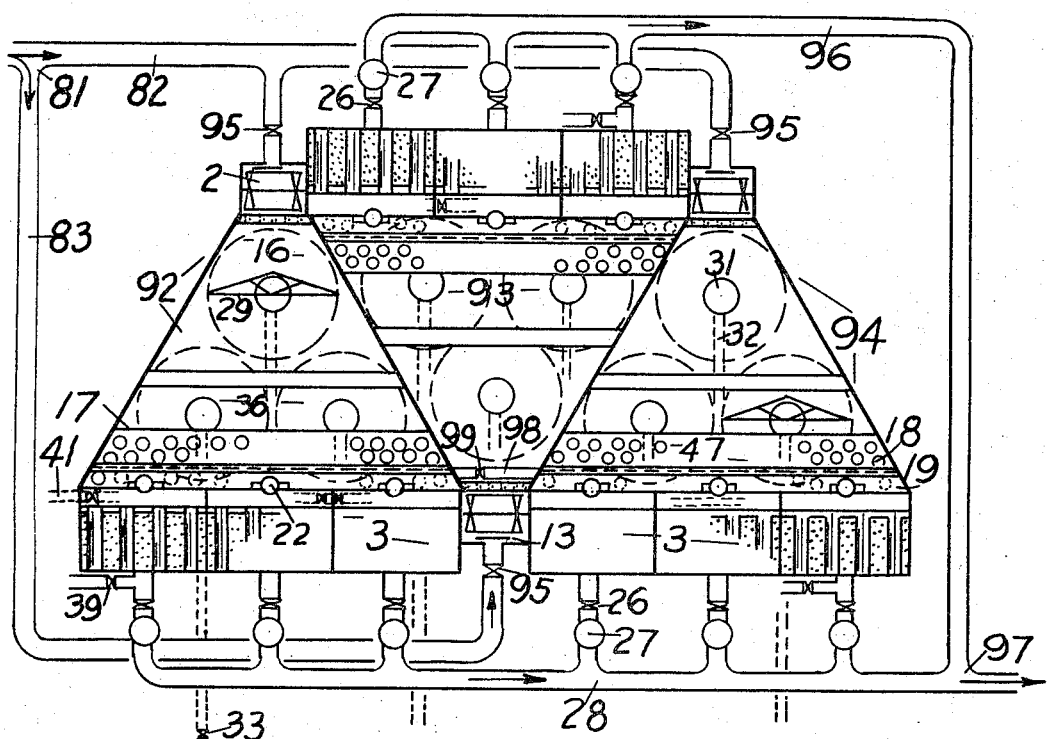

3,353,679
TRIANGULAR-TYPE HORIZONTAL FLOW
SETTLING BASINS
A. Adler Hirsch, 141 Norwood St.,
Shreveport, La. 71105
Filed Jan. 5, 1966, Ser. No. 518,831
8 Claims. (Cl. 210—259)

ABSTRACT OF THE DISCLOSURE

In a substantially flat bottomed basin having divergent side walls liquid is introduced at the vertex and settled effluent removed at the opposite base. Since the cross-section normal to flow increases with travel, the velocity of the fluid correspondingly decreases, thereby obtaining more nearly perfect quiescence and enhanced settling. Short circuiting is prevented and radially outward type flow is induced by an inclined orificed effluent baffle extending the length of the outlet wall. Triangular basins may be compactly nested together to occupy half the area of an equivalent set of rectangular basin, the direction of flow in adjacent basins being reversed.

Figure 5:
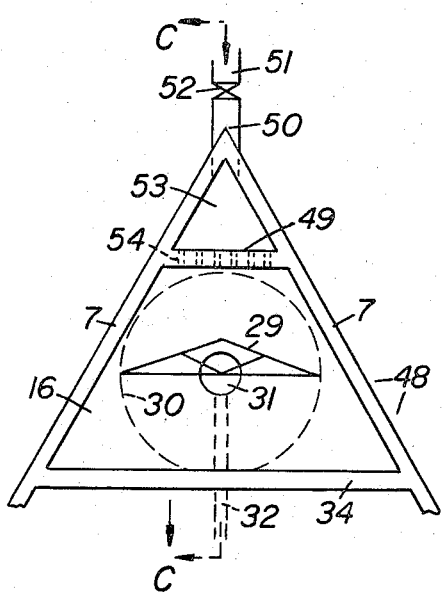

My invention relates to improvements in settling basin design and arrangement primarily for treatment of water, sewage, industrial wastes and process liquids. In general, its principles may be applied to all cases of liquid flow of sufficient bulk wherein sedimentation is an integral part.

Settling basins may be classified into two groups according to type of flow, namely: upflow and horizontal. Upflow tanks are of comparatively limited capacity per unit; the direction of flow, as indicated, is upward from the bottom portion. These do not fall within the scope of this specification. Horizontal flow tanks, as the name implies, provides for passage of liquid theoretically in horizontal stream lines, ideally equidistant from each other. Such tanks are used in the great majority of water and anti-pollution treatment plants, particularly those of large size.

Horizontal tanks are usually rectangular in shape, liquid entering one end and settled effluent leaving the other. They may also be of the radial flow type in which the influent enters at the center and flows outwardly toward the periphery. Radial tanks are usually circular in shape. This specification applies specifically to that type of horizontal flow basin in which the flow is from one end to the other, with an intermediate settling zone therebetween.

Although horizontal basins seemingly should provide for uniformly distributed flow throughout a cross section, such an occurrence in nature is purely fanciful. Amongst basins constructed heretofore departures from ideal, piston type flow are universal. This is due to several causes including uneven introduction of influent stream, jet action at the inlet, dead spaces at the inlet, interferences from intervening structures particularly baffles, openings in division walls and structural discontinuities, effects of the walls themselves, short circuits, dead spaces near the outlet, and, finally and most important, converging stream lines at the outlet which produce chimney draft effects. These disturbances seriously hamper the process of sedimentation and limit the quality of the effluent. The convergence effect with upsweep of current usually carrying discrete particles operates in all basins, regardless of the degree of elimination of other structural or hydraulic defects, unless it is specifically prevented by such a device as presented by application in Patent No. 3,221,889. Use of the counter-structures disclosed therein will avoid terminal updraft, and thereby greatly reduce the suspending and resuspending effects on floc or settleable particles due to other basin deficiencies.

However, even placing an effluent training structure as above at the terminus of a horizontal flow rectangular tank will not achieve more than corrective type improvements. As a liquid advances down the length of a basin the floc clusters or particulate matter subside, the larger and heavier ones first, followed continuously by sedimentation of smaller particles. Settling of particles in a moving fluid depends on its velocity, the smaller particles subsiding only at the lower velocities. Once a critical flow-through velocity is exceeded for a given size and type of particle, residual turbulence will never permit it to settle out, regardless of its retention time in a basin or the length of the unit. Therefore, to accomodate the decreasing settleability within the spectrum of smaller particles, the velocity of the liquid passing through a settling tank should be continuously reduced toward the outlet.

The main object of this invention is to provide increased settleability as particles advance flow-wise through a tank or basin. This is done by increasing the width of the basin progressively with its length, thereby forming a tri-angularly-shaped basin or tank. The actual configuration of the settling zone in order to have divergent sides may be either triangular or trapezoidal, in either case the effect fundamentally is that of a triangular-type tank.

The only other alternative for enlarging the cross section of the basin toward the effluent end would have been to progressively increase the depth. But this would pose additional depth for a particle to settle through and so would in the end accomplish nothing advantageous.

Increasing the width at the outlet while retaining a narrow inlet ordinarily induces short circuits that are highly disturbing to sedimentation. To avoid this consequence in a triangular-type horizontal flow basin the only known defense is the installation of an inclined, perforated effluent training baffle as described in Patent No. 3,221,889. Use of such a device in a triangular-type basin will yield the highest possible performance obtainable in a horizontal flow settling unit both quality-wise and quantity-wise. Another object of this invention, then, is to disclose a structure wherein the effluent training devices as aforementioned can serve with maximum effectiveness.

Since improvement in rate of production and quality of effluent both result from a triangular-shaped horizontal flow basin equipped with an effluent training device as aforementioned, another important object of this invention is to provide a means for achieving these advantages. The decrease in particulate content in a liquid is necessarily desirable for clarity. Enhanced clarity will result from applicant's structure, and in some cases obviate the necessity for subsequent filtration; or, where filtration is still in order, the load on the filters will be reduced considerably.

When silt in water is coagulated by alum, with subsequent pH correction prior to filtration, the presence of floc particles in the basin effluent permits resolution of some of the precipitated aluminum hydroxide floc; this later plates out as after-precipitate when the pH of the water later drops, some in the filters and some in the distribution system. Another object of this invention is to reduce the opportunity for resolution of unsettled floc and its later after-precipitation.

Since full utilization of the settling capacity of a coagulation basin is achieved by means of a triangular type plan in conjunction with applicant's inclined orifice baffle at the effluent end, a smaller dosage of coagulant and coagulant aid will suffice for clarification. Aside from the obvious advantage of economy in amounts and costs of coagulating chemicals, a smaller dosage of pH correctives, such as lime and sodium alkalies, will be required for anti-corrosion adjustment. Here again, economy in chemical costs will result, but a more important benefit is the lower amount of dissolved solids built up in the effluent. Particularly when lime is used, the hardness in the effluent will not be increased to the extent experienced in other plants. Hence, another object of this invention is to reduce chemical costs for coagulants and alkalinity correctives and to check the increase in dissolved solids and hardness as usually experienced.

Inasmuch as floc rising and discharging in the effluent of a settling basin also carries an undetermined load of bacteria, some live, some dead, their spores, possible virus or decomposition products and perhaps other biological pathogens, elimination of particulate matter and highest attainable clarity in the basin effluent is of utmost importance. Hence a significant object of this invention is to improve the sanitary quality of a basin effluent, and to withhold from the filters any ultrafilterable virus. As indicated previously, this precaution is especially desirable in cases wherein the floc tends to redissolve upon alkalinizing.

With the cost of real estate rising due to expanding populations, extending city limits and inflationary prices, the areal extent of a water or waste treatment plant or process basin requires increasing capital investment. The triangular configuration of applicant's basins enables a group of them to be nested together without diminishing their settling capacities and without wasting land. Another object of this invention is to permit the highest settling basin performance possible with a given investment in land area.

Settling basins are generally designed to provide a certain length of effluent weir per 1,000 gallons per minute overflow. Experience indicates that discharge should not exceed 50,000 gallons per day per foot of length. Since triangular-type basins, either singly or in dove-tailing sets, present a maximum weir length, substantially double that possible in conventional rectangular basins, another object of this invention is to maximize this important dimenson and thereby permit increased production.

Another object of this invention is to reduce construction costs of settling basins. The perimeter of a triangular-type tank, as well as its area, are considerably less than that for a rectangular tank of equal length and width at the effluent end. The effluent end is used as a basis for dimensional comparison since this is the determinant of the final velocities and hence the eventual settleability limits for floc particles. Therefore, a savings results in the amount of excavation for a basin structure and in materials of construction for floor and walls.

By grouping basins compactly together connection of the prior treatment devices, such as flocculators, if any, and the subsequent treatment stages, with or without intermediate treatment, or filters is readily arranged. Also connection of various necessary services, piping and electrical, is simplified. Attendance of operators and maintenance crews is facilitated.

Nesting of triangular outline settling tanks additionally provides for easy manifolding of influent and effluent lines along the inlet and outlet ends, respectively. Also the length of conduit or piping is minimized when connecting these units in tandem, as when secondary treatment or settling is desired. When filters are built integrally with the basin structure easy passage thereto is possible, as well as permitting cross flow of applied water to the filters from a plurality of basins. Hence, another object of this invention is to facilitate grouping of related treatment units and simplifying operation.

The various objectives of this invention are achieved by constructing the horizontal flow basin to have a distributive entrance followed by linear flow between diverging side walls. Hence the basins are primarily of triangular type, which include true triangles and those trapezoids and trapeziums having one definitely short base. In cases where two or more basins are required their homologous sides are made common, and the flow in one is opposite in direction from that in the abutting basin. In all cases flow is divergent toward the effluent thereby reducing the velocity of the liquid and permitting better subsidence. Because the flow is diveregnt rather than straightline piston fashion, an effluent training device is mandatory to space the flow lines properly and to avoid short circuiting and dead pockets which would otherwise defeat the purpose of triangular configuration.

As a result the quality of the basin effluent is significantly improved by reducing carryover of floc and discrete particles. In a water plant this reduces the load on the filters, minimizes resolution of alum floc and after precipitation, and avoids sanitary hazards. In sewage or waste treatment plants, triangular basins reduce the suspended solids in secondary treatment units and, by eliminating escape of floc from final settling basins, greatly improve the B.O.D. characteristics of the effluent discharged to a receiving stream. Amount of chlorination can be correspondingly reduced with resulting economy.

Figure 7:
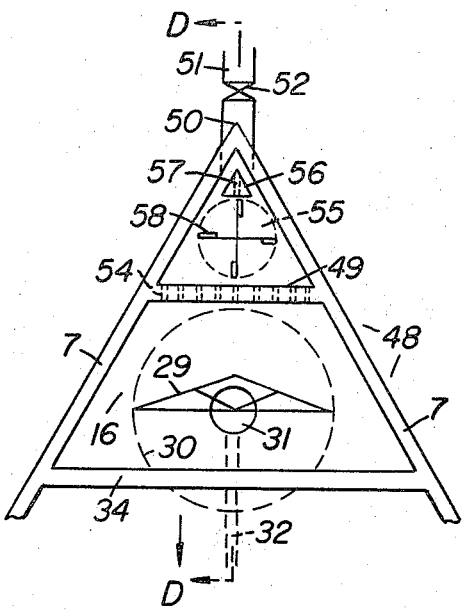
Figure 6:
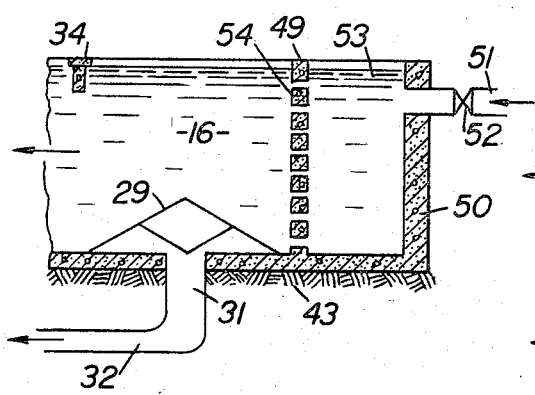
Figure 8:
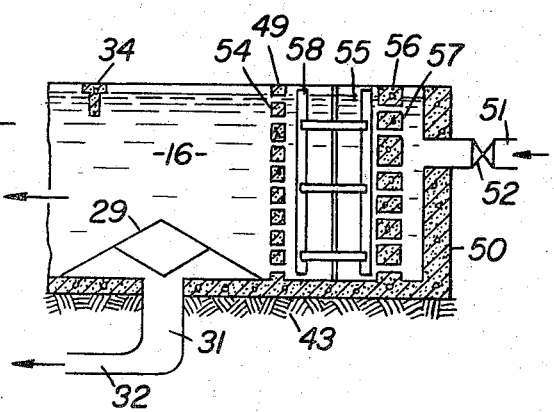

Having indicated the general features and advantages of my invention a more detailed discussion now follows with aid of the drawings in which:

FIGURE 1 is a plan view of a triangular type settling basin with an integrally attached flocculator at the apex and a set of filters on the base, FIGURE 2 is a cross section of FIGURE 1 along line AA, FIGURE 3 is a partial plan view of the effluent end of a triangular type basin, such as in FIGURE 1, but without integrally attached filters, FIGURE 4 is a cross section of FIGURE 3 cut along line BB, FIGURE 5 is a plan view of the inlet half of a truly triangular settling basin without a flocculator attached, FIGURE 6 is a cross section of the portion of the basin shown in FIGURE 5, along axis CC, FIGURE 7 is a plan view of the inlet half of a truly triangular settling basin with a flocculator built integrally at the apex, FIGURE 8 is a cross section of the portion of a basin shown in FIGURE 7, cut along the median DD, FIGURE 9 is a geometric pattern illustrating the principle of nesting triangles, FIGURE 10 is a plan view of a nested set of triangular type basins without integral filters, and FIGURE 11 is a plan view of a dovetailing set of triangular type basins having integral filters.

Referring now to each of the various figures:

In FIGURE 1, water, liquid waste or other liquid containing suspended matter enters triangular type basin 1 after having passed through flocculator 2 located at its short base or apex. Final effluent from the system leaves after passing through filters 3. The flocculator is bounded by a front wall 4, side walls 5, 5 and an orifice type effluent wall 6. This effluent wall 6 forms the short base or virtual apex of triangular type basin 1.

The triangular type basin 1 is bounded on the apical or entrant end by orifice wall 6, on the sides by isoscelene walls 7, 7 and by an effluent wall 8 at its base. The side walls 7, 7 of triangular basin 1 converge toward the inlet end and diverge toward the long base at the effluent wall 8.

Although this basin performs hydraulically essentially like a triangle, from the standpoint of strict geometrical shape the settling compartment more accurately defines a trapezoid. However, the width of the apical base, represented by orifice wall 6, is relatively small compared to that of the base at the effluent wall 8, hence the descriptive term triangular-type accurately characterizes this form of settling basin. There are no substantial conceptual or performance differences between a triangular type trapezoidal basin and a truly triangular basin as described later.

The battery of filters 3 are bounded by an influent wall 8, side walls 9, 9 and a rear wall 10. Walls 6 and 8 are both common to their respective preceding and subsequent units, and hence serve dual influent-effluent functions.

Water or other liquid enters the flocculator by way of influent pipe 11 through sluice 12 and is deflected laterally by inlet baffle 13 to avoid formation of a jet current. Agitator means 14 builds the size of floc to promote later settling. Orifices 15 distribute the liquid uniformly as it enters the first compartment 16 of the settling basin. These orifices may be plugged selectively in those areas where flow is excessive thereby controlling its distribution and enabling uniform influx into the sedimentation tank.

In the triangular type settling basin 1 current is maintained uniform across a section normal to its flow by virtue of the distributive action of orifice wall inlet 6 but more particularly by the inclined outlet training baffle wall 17. After passing through ports 18 of effluent baffle 17 the settled liquid flows into a final collection means here shown as a terminal conduit 19 into which the liquid spills over an H-weir 20 in wall 21. Effluent from the basin discharges through valves or sluices 22 into the gullet 23 of the filters, between front wall 8 and head wall 24. After filtering through media 25 clear liquid finally emerges through outlet valve 26 and filter controller 27 into effluent manifold 28 which leads to clear water storage or pumps.

Sediment is continuously removed from the basin by means of a set of rotary clarifier rakes 29 which sweep over a circular path 30. The scrapings are pushed to a central sump 31 where they drain off through drain line 32. Rate of underflow is controlled by sludge draw off valves 33.

Floating material is retained in the forward settling zone 16 of basin 1 by means of skimmer wall 34 which extends for several feet below the surface of the liquid. This shallow curtain type wall or barrier is built in a T-section 35 to permit an unsupported span between the side walls and also to provide a walk for inspection of the progress of sedimentation. The skimmer separates the first portion 16 of the settling zone from the rear portion 36 of the triangular basin.

For purpose of illustration the filters are shown as the porous underdrain type. Water applied over the wash troughs 37 percolates through a layer of sand or similar media 25 supported directly by a porous plate underdrain. Wash water is admitted through wash water line 38 and valve 39. Washings flow to waste through drain valve 40 and drain line 41. The wash water troughs 37 rest on head wall 24 and spill backwash run off into end gullet 23.

A battery of three filters is furnished in order to permit continuous operation whenever one is taken out of service for backwashing or for maintenance purposes. The individual filter influent valves 22 in the end wall of the settling basin permit this isolation.

FIGURE 2 shows in cross section the path of the liquid through the complex consisting of flocculator 2, triangular type basin 1 and filters 3. The role of inclined orifice baffle 17 at the effluent end of the basin in parallelizing the advancing flow filaments through the overall settling zone 42 of the basin is more apparent in this view. Relation of the structures with grade 43 is indicated. Porous plate underdrains 44 of the filters are shown here.

FIGURE 3 shows an independent version of the triangular type basin construction without unitized filters in conjunction therewith. The influent end, not shown, may or may not be provided with a flocculator according to the needs of the liquor. The entry structure may be an orifice wall 6, as in FIGURE 1, or even a simple pipe or conduit end, since the effluent orifice wall 17 will rectify flow and prevent short circuiting.

Since the basin effluent end is protected against terminal upsweep by inclined orifice wall 17, the draw off 44a can be a single sluice or valve opening to the effluent line 45. In this case a terminal weir trough 19, as in FIGURES 1 and 2, is superfluous. As before, the basin is equipped with clarifier rakes 29, central sumps 31, drain lines 32 and sludge draw off valves 33. A hydraulic cylinder 46 is shown as the operator for the basin effluent sluice.

FIGURE 4, a section of the independent triangular type basin of FIGURE 3, along axis BB, shows the course of the liquor toward the effluent end. After passing through first and second sections 16 and 36, respectively, of the settling zone, liquid in laminar filaments under guidance by selected orifice 18 openings in inclined baffle 17 enters the draw off zone or effluent bay 47. Here turbulence is of no moment since baffle 17 isolates the settling from the draw-off portions of the basin.

FIGURE 5 shows the influent half of a truly triangular settling basin 48. Sides 7, 7 continue beyond internal orifice wall 49 to meet apically at vertex 50. Construction of the effluent half of the basin follows the principles explained for FIGURES 1 and 3.

Influent liquid, entering at the apex through inlet line 51 and inlet valve 52, passes into forebay or inlet chamber 53. The object of this chamber is to provide capacity or stilling volume before the liquid flows through orifices 54 in wall 49. Some of the orifices are plugged as required to provide uniform influx into the first portion 16 of the settling compartment. The remainder of the structure resembles that of FIGURE 3. Since no flocculation has been provided final filters are not appended at the base. However, with certain liquids, filters such as item 3 of FIGURE 1 may be used.

FIGURE 6 shows a cross section of the true triangular basin 48 of FIGURE 5. The basin is shown in elevation resting on grade 43. Other features are as described above.

In the true triangular basin 48 shown in FIGURE 7 is included an integral flocculator unit 55. After entry at the apex of the basin 50 liquid is deflected and distributed by spreader baffle 56. This is triangular in section to direct part of the liquid along the side walls 7 and also contains orifices 57 to transmit some of the liquid centrally. Agitation within the flocculator is obtained by vertical paddles 58.

On leaving the flocculator compartment liquid passes through orifices 54 in wall 49, some of them plugged where disparity in the amount of current indicates the need, into the first section 16 of the settling zone.

Effluent details resemble those in FIGURE 1, as a set of filters 3 will usually be provided where flocculation is a part of the process. Otherwise the simplified construction shown in FIGURE 3 may be selected.

FIGURE 8 shows the cross section of the truly triangular basin of FIGURE 7 when cut along the altitude, the axis DD. The relations of the various parts, identified above, are shown sequentially in elevation with respect to each other and the operating liquid level. This is maintained near the top of the vertical stem of skimmer 34.

FIGURE 9 illustrates the complete nesting or meshing properties of triangles as a geometric characteristic. Triangles 59, 60, 61 and 62 having bases 63, 64, 65 and 66 with vertices 67, 68, 69 and 70, respectively, are compactly arrayed in dovetail fashion along common sides 71, 72 and 73. Extension and replication from either end, still preserving the unit triangular pattern may be done indefinitely as indicated by the broken lines 74 and 75.

The underlying principle of triangular shape for a settling basin is clearly illustrated in this diagram. If the whole perimetrically enclosed area were operated as a large, single basin the forward velocity of a particle of liquid would be uniform along its length of travel. At the end selected for entry where the particles are preponderantly large and heavy, the velocity of flow would be the same as at the effluent end where the suspended matter is much lighter and smaller, whereas logically this final velocity should be slowed. The length of draw off when the combination is operated as a parallelogram would be the sum of the lengths of any two collinear bases, such as 63, 65, or simply 2(63).

Now by dividing the above area into triangles as indicated and directing flow from apex to base, the forward velocity of a particle of liquid is continuously reduced thereby promoting improved settling action in the expanding section toward the draw off at the base. Furthermore, residual turbulence from entrant currents are more effectively dissipated by the increasing bulk of liquid in the basin than would be the case for rectangular or parallelogram shapes. The final velocity is determined by the length of draw off structure, which in this case is the sum of the lengths of all the bases, viz, 63, 64, 65, 66, or simply 4(63). This is twice the length shown above for a parallel sided basin. Since rate of settling depends on a high power of the velocity of the fluid, the sedimentation performance inherent in a triangular outline is considerably enhanced according to a high power of 2.

Direction of flow of fluid through adjacent basins will be in opposite compass directions. Any complication in piping and services occasioned by this circumstance is trivial in comparison with the advantages that accrue from this configuration, particularly those dealing with quality of effluent.

FIGURE 10 shows such a grouped set of triangular type basins each similar to that illustrated singly in FIGURES 3 and 4. Basins 76, 77 and 78 are arranged in succession with common sides 79 and 80 between the respective adjoining pairs. Influent divides at T 81 into separate lines 82 and 83 which feed their respective basins through sluices 12, 12, 12 into flocculators 2, 2, 2. A deflector plate such as 13 of FIGURE 1 may or may not be indicated according to conditions. Liquid passes through orifice walls 6 into the triangular type basins. After quiescent flow through the settling zones 16 and 36 the clarified liquor toward the effluent end approaches the inclined orifice baffle walls 17 in orderly regime and afterward converges in the draw off bay 47, turbulence now being immaterial, into the effluent sluices 44 and enters the effluent lines 84 and 85. These lines, serving the upper and lower bases of the triangles, meet at effluent T 86 to convey the clear liquid to the next step, if any, in the process. For certain liquids the flocculators may be eliminated.

The above schedule has been described for parallel operation of the basins. However, the triangular pattern is characterized by flexibility and permits series operation such as required for split treatment or secondary settling. As an example of tandem operation basins 76 and 78 can readily precede basin 77. Influent is fed to basins 76 and 78 as usual, but valve 87 in the influent line to basin 77 is closed. Cross over valves 90 and 91 are then opened admitting effluent from basins 76 and 78 into the blocked off portion 91a of influent line 83, thence to the flocculator of basin 77. The combined settled final effluents discharge through sluice 44 at the effluent end of basin 77 into effluent line 85 and out from the system through T 86.

FIGURE 11 shows a triangular group arrangement of triangular type settling basin units as illustrated separately in FIGURE 1. These basins 92, 93 and 94 each have an integrally connected bank of filters 3.

Influent liquor T's off at 81 into branches 82 and 83 which, through influent valves 95, feed into the advance located flocculators 2. Structural details and flow through these basins is identical with that described for FIGURE 1 except that flow through middle basin 93 is opposite in compass direction to that in outside basins 92 and 94. Final effluent from the upper bank of filters flows through finished water line 96 and merges at T 97 with lower filter bank effluent from conduit 28. Services and incidental structural detail is the same as in FIGURE 1.

Any filter may be operated at a given end of the triangular group even when its integrally attached basin is closed off at a valve 22 for purposes of cleaning or maintenance by drawing from other homologous basins through a cross over line 98 and valve 99. This line then connects the effluent troughs 19 between alternate basins.

If desired a two-stage series flow may be provided for by piping as described for FIGURE 10.

The triangular shaped basin and its interwedged combinations in a plurality of like basins admits of various modifications having divergent side walls not detailed here, since the most advantageous embodiments have been presented. However, all other modifications providing decelerated flow fall within the scope of this invention and claims are cast to embrace them. Some on the alternatives are: Combinations of triangular type basins may be in sets other than the trios illustrated herein; more elaborate cross over connections between abutting as well as between alternate basins is possible when needed; such features as angle of convergence at the apex of the basin, presence, absence, or extent of preceding flocculation, variations in type of agitator, contact box, forebay or other such structure, departure of sides of triangular type basin from a straight line into broken lines or curves, variations from isosceles sides, angulation of base or effluent end other than perpendicular to the geometrical altitude of the figure, variation in number, arrangement or structural details of the integral filters, changes in piping details and valving and other accompanying particulars which come within the purview of this specification. Also included are variations from triangles and trapezoids to form trapeziums or other irregular quadrilaterals or other polygons that permit decelerated flow of the advancing liquid.

I claim:

1. A triangular-type horizontal flow settling basin for liquids containing suspended solids having an influent end, an influent supply conduit to deliver liquid to said influent end, an effluent end, said effluent end being at a wall distal to said influent end, a settling zone intermediate said influent end and said effluent end, a distributive wall in advance of said settling zone separating same from said influent end, openings in said distributive wall, plugs in some of said openings to establish uniformity of flow therethrough, a substantially flat floor, means for removing settled sludge from said floor, an inclined orificed effluent baffle across the length of said wall at said effluent end and extending downwardly almost to the level of said sludge, plugs in some of the orifices in said inclined orificed effluent baffle to adjust the flow of liquid therethrough to establish uniformity across the entire area thereof, an effluent draw off bay between said inclined orificed effluent baffle and said wall at said effluent end, draw off means communicating with said bay, the side walls of said basin disposed divergently from said influent end toward said effluent end so as to cause uniform deceleration of the liquid as it advances across said settling zone.

2. The apparatus of claim 1 in which said divergent side walls and said wall at said effluent end form a triangle, said influent end being located at the vertex thereof opposite said effluent end and said distributive wall in advance of said settling zone extending almost to said floor.

3. The apparatus of claim 2 in which a flocculator means is located at said influent end between said vertex and said distributive wall in advance of said settling zone.

4. The apparatus of claim 1 to which a battery of filter units are built integral with said basin abutting said effluent end, said wall at said effluent end being a common division wall between said effluent end and said filters, passageways through said division wall and valving means to control admission of effluent from said basin to each unit of said battery of filters.

5. The apparatus of claim 1 in which said influent end is the entrant wall of said basin, said entrant wall, said divergent side walls and said wall at said effluent end forming a trapezoid, said entrant wall being the short base thereof, a flocculator means in advance of said entrant wall, said entrant wall being common to said flocculator means and to said basin, said entrant wall being said distributive wall and extending to the bottom of said flocculator, said settling zone extending from said entrant wall to said inclined orificed effluent baffle and said draw off means terminating in an effluent conduit.

6. The apparatus of claim 5 including a battery of triangular-type horizontal flow settling basins, the divergent side walls of each adjacent unit of said battery being common to the adjacent units thereof, the entry of influent liquid being at the short base of one unit and being at the opposite end of said battery from the entry of influent liquid at the short base of the next adjacent unit, flow of liquid through said adjacent units being in opposite directions, influent supply and effluent conduits each being manifolded to said flocculators and to said effluent draw off means, respectively, a valved interconnection between said effluent conduit of one said unit and said influent manifold leading to the adjacent unit, another valve in said influent conduit in advance of said interconnection to permit the joint use of said adjacent basins in series, flow of liquid through said adjacent units when so interconnected being in opposite directions.

7. The apparatus of claim 5 to which a battery of filter units are built integral with said basin abutting said effluent end, said wall at said effluent end being a common division wall between said effluent end and said filters, passageways through said division wall and valving means to control admission of effluent from said basin to each unit of said battery of filters.

8. The apparatus of claim 7 including a battery of triangular-type horizontal flow settling basins, each unit of said battery having an integral battery of filters, the divergent side walls of each adjacent basin being common to the adjacent basins, the entry of influent liquid being at the short base of one basin and being at the opposite end of said battery of basins from the entry of influent liquid at the short base of the next adjacent basin, flow of liquid through said adjacent basins being in opposite directions, influent supply and effluent conduits each being manifolded to said flocculators and to said effluent draw off means, respectively, a valved cross over interconnection between said effluent draw off means of alternate basins to permit effluent liquid from one basin to feed the filters integral with an alternate basin.

References Cited

UNITED STATES PATENTS

| | | | |
|---|---|---|---|
| 584,736 | 6/1897 | Goodhue | 210—256 |
| 651,834 | 6/1900 | Deutsch | 210—253 |
| 651,835 | 6/1900 | Deutsch | 210—202 |
| 732,208 | 6/1903 | Mitchell | 210—202 |
| 1,775,233 | 9/1930 | Brakensiek | 210—259 |
| 2,071,320 | 2/1937 | Coberly | 210—534 |
| 2,118,157 | 5/1938 | Camp | 210—519 |
| 2,275,954 | 3/1942 | Gibson | 210—256 |
| 2,291,641 | 8/1942 | Lemmon | 210—525 |
| 2,342,024 | 2/1944 | Walker | 210—525 |
| 2,343,179 | 2/1944 | Hauck | 210—195 |
| 2,428,756 | 10/1947 | Lind | 210—528 |
| 2,766,203 | 10/1956 | Brown et al. | 210—259 |
| 2,920,763 | 1/1960 | Lind et al. | 210—525 |
| 3,221,889 | 12/1965 | Hirsch | 210—532 |

REUBEN FRIEDMAN, *Primary Examiner.*

J. L. DE CESARE, *Assistant Examiner.*